US011494993B2

(12) United States Patent
Harvey

(10) Patent No.: US 11,494,993 B2
(45) Date of Patent: *Nov. 8, 2022

(54) SYSTEM AND METHOD TO INTEGRATE CONTENT IN REAL TIME INTO A DYNAMIC REAL-TIME 3-DIMENSIONAL SCENE

(71) Applicant: Famous Group Technologies Inc., Culver City, CA (US)

(72) Inventor: Gregory Lawrence Harvey, Hermosa Beach, CA (US)

(73) Assignee: Famous Group Technologies Inc., Culver City, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 17/032,809

(22) Filed: Sep. 25, 2020

(65) Prior Publication Data

US 2021/0082194 A1 Mar. 18, 2021

Related U.S. Application Data

(63) Continuation of application No. 16/515,750, filed on Jul. 18, 2019, now Pat. No. 10,818,094, which is a (Continued)

(51) Int. Cl.
*G06F 16/387* (2019.01)
*G06F 16/9536* (2019.01)
(Continued)

(52) U.S. Cl.
CPC ....... *G06T 19/006* (2013.01); *G06Q 30/0277* (2013.01); *G06T 13/40* (2013.01); (Continued)

(58) Field of Classification Search
None
See application file for complete search history.

(56) References Cited

U.S. PATENT DOCUMENTS 10,033,992 B1 7/2018 Mcgowan
10,482,660 B2 11/2019 Harvey
(Continued)

FOREIGN PATENT DOCUMENTS

WO WO-2016130935 A1 8/2016

OTHER PUBLICATIONS

"U.S. Appl. No. 15/042,773, Final Office Action dated Feb. 7, 2019", 18 pgs.
(Continued)

*Primary Examiner* — Nicholas R Taylor
*Assistant Examiner* — Ho T Shiu
(74) *Attorney, Agent, or Firm* — Schwegman Lundberg & Woessner, P.A.

(57) ABSTRACT

System integrating content in real-time into dynamic 3D scene includes external server including CMS, a device including content integrating engine to process in real-time 3D scenes, and display device to display combined 3D scene output. CMS searches for social media posts on social media servers. Social media posts includes message and URL to media content. Content integrating engine includes content retriever, content queue, 3D scene component processors to process each 3D scene's visual components, scene manager and combiner. Content retriever establishes direct connection to external server, and retrieves URLs from server storage and stores URLs in content queue. Scene manager, at time of low intensity during 3D scene, signals to content retriever to retrieve media content corresponding to URLs in content queue, one scene component processor to process display setting change, or another scene component processor to process media content. Combiner to generate combined 3D scene output. Other embodiments are described.

20 Claims, 11 Drawing Sheets

Related U.S. Application Data continuation of application No. 15/042,773, filed on Feb. 12, 2016, now Pat. No. 10,482,660.

(60) Provisional application No. 62/200,646, filed on Aug. 4, 2015, provisional application No. 62/200,118, filed on Aug. 3, 2015, provisional application No. 62/156,461, filed on May 4, 2015, provisional application No. 62/116,367, filed on Feb. 13, 2015.

(51) Int. Cl.

| | | |
|---|---|---|
| *G06Q 30/02* | (2012.01) | |
| *G06T 19/00* | (2011.01) | |
| *H04N 21/81* | (2011.01) | |
| *H04N 21/482* | (2011.01) | |
| *H04N 13/194* | (2018.01) | |
| *G06T 13/40* | (2011.01) | |
| *H04L 65/60* | (2022.01) | |
| *H04L 67/02* | (2022.01) | |
| *H04L 67/10* | (2022.01) | |
| *H04N 13/106* | (2018.01) | |
| *H04N 21/4223* | (2011.01) | |
| *H04N 21/20* | (2011.01) | |

(52) U.S. Cl.
CPC .............. *H04L 65/60* (2013.01); *H04L 67/02* (2013.01); *H04L 67/10* (2013.01); *H04N 13/106* (2018.05); *H04N 13/194* (2018.05); *H04N 21/4828* (2013.01); *H04N 21/812* (2013.01); *H04N 21/816* (2013.01); *H04N 21/8146* (2013.01); *G06T 2219/2008* (2013.01); *H04N 21/20* (2013.01); *H04N 21/4223* (2013.01)

(56) References Cited

U.S. PATENT DOCUMENTS

| | | |
|---|---|---|
| 2011/0225515 A1 | 9/2011 | Goldman et al. |
| 2012/0047219 A1 | 2/2012 | Feng et al. |
| 2012/0207290 A1 | 8/2012 | Moyers et al. |
| 2013/0046781 A1 | 2/2013 | Frankel et al. |
| 2014/0108585 A1 | 4/2014 | Barton et al. |
| 2017/0236329 A1 | 8/2017 | Harvey |
| 2018/0197335 A9 | 7/2018 | Harvey |
| 2019/0340828 A1 | 11/2019 | Harvey |

OTHER PUBLICATIONS

"U.S. Appl. No. 15/042,773, Non Final Office Action dated Jul. 16, 2018", 15 pgs.

"U.S. Appl. No. 15/042,773, Notice of Allowance dated Oct. 8, 2019", 12 pgs.

"U.S. Appl. No. 15/042,773, Response filed May 7, 2019 to Final Office Action dated Feb. 7, 2019", 9 pgs.

"U.S. Appl. No. 15/042,773, Response filed Sep. 20, 2019 to Final Office Action dated Feb. 7, 2019 & Notice of Non-Responsive Amendment dated Jun. 28, 2019", 13.

"U.S. Appl. No. 15/042,773, Response filed Oct. 16, 2018 to Non Final Office Action dated Jul. 16, 2018", 14 pgs.

"U.S. Appl. No. 16/515,750, Non Final Office Action dated Feb. 24, 2020", 11 pgs.

"U.S. Appl. No. 16/515,750, Notice of Allowance dated Jul. 13, 2020", 10 pgs.

"U.S. Appl. No. 16/515,750, Response filed May 13, 2020 to Non Final Office Action dated Feb. 24, 2020", 9 pgs.

"International Application Serial No. PCT/US2016/017779, International Preliminary Report on Patentability dated Aug. 24, 2017", 9 pgs.

"International Application Serial No. PCT/US2016/017779, International Search Report dated Jul. 21, 2016", 2 pgs.

"International Application Serial No. PCT/US2016/017779, Written Opinion dated Jul. 21, 2016", 7 pgs.

SYSTEM AND METHOD TO INTEGRATE CONTENT IN REAL TIME INTO A DYNAMIC REAL-TIME 3-DIMENSIONAL SCENE

CROSS-REFERENCE TO RELATED APPLICATIONS

This application is a continuation of U.S. patent application Ser. No. 17/032,809, filed on Sep. 25, 2020, which is a continuation of U.S. patent application Ser. No. 15/042,773, filed on Feb. 12, 2016, which claims the benefit pursuant to 35 U.S.C. 1 19(e) of U.S. Provisional Application No. 62/116,367, filed Feb. 13, 2015, U.S. Provisional Application No. 62/156,461, filed May 4, 2015, U.S. Provisional Application No. 62/200,118, filed Aug. 3, 2015, and U.S. Provisional Application No. 62/200,646, filed Aug. 4, 2015, which applications are specifically incorporated herein, in their entirety, by reference.

FIELD

An embodiment of the invention relate generally to a system and method to integrate content in real-time into a dynamic 3-dimensional (3D) scene. Specifically, the content being integrated and processed in real-time into the 3D scene display may include social media content (e.g., Tweets™ on Twitter™, Facebook™ posts, Snaps on Snapchat™, Instagram™ posts, etc.), advertisement content, user content (e.g., picture, image, video, etc.) uploaded by the users, etc.

BACKGROUND

As more and more people adopt social media to share their experiences, opinions, and bond with each other, social media networks such as Twitter™, Facebook™ and Instagram™ continue to grow and dominate our social culture globally. The popularity of social media has revolutionized the general public's ability communicate information to a wide audience. Unlike previous generations, present technologies allow for user's to disseminate in real time their comments or media content (e.g., pictures, videos, etc.) pertaining to an event while the event is happening. For instance, during live events such as professional sports games, concerts, and conventions, the users in attendance may send comments via Twitter™ or pictures via Instagram™ of the live event, which will be disseminated to their followers on the social media platforms. Via the user's geo-location tagging (e.g., checking in to a location or adding a location to a social media post) or the user including a hashtag ("#") to his social media post, an advertiser (e.g., the live event's space, the retailers, the restaurants or bars, etc.) may locate pertinent social media posts and may re-publish these social media posts as a way to engage with these users and other potential customers.

In addition to the communicating to a wide audience (e.g., all followers on Twitter™ or Instagram™), various social media platforms allow for the users to communicate directly to other specific users (e.g., direct message friends on Facebook Messenger™). In these direct communications, users are able to share static 2D pictures to each other or images or 2D animated gifs.

Currently, to integrate any content into a dynamic 3D display requires either (i) pausing the 3D animations that are displayed to the user or (ii) pre-rendering the content into each 3D scene and incorporating the pre-rendered content into a video that can be played at a later time without real time updates. Due to these limitations, current systems are not conducive to integrate in real time social media content into a 3D scene.

Thus, the current systems fail to provide a dynamic 3D platform to create customized real-time 3D experiences integrated with social aggregated content that is user generated (e.g., directly by the user or organization or brand), or data sourced from a metadata database, or content (e.g., photos, videos, posts) from social media platforms such as Facebook™, Instagram™, Twitter™, Vine™, Snapchat™, etc. Similarly, the current systems cannot enable real-time dynamic and interactive personalized 3D messaging between users.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
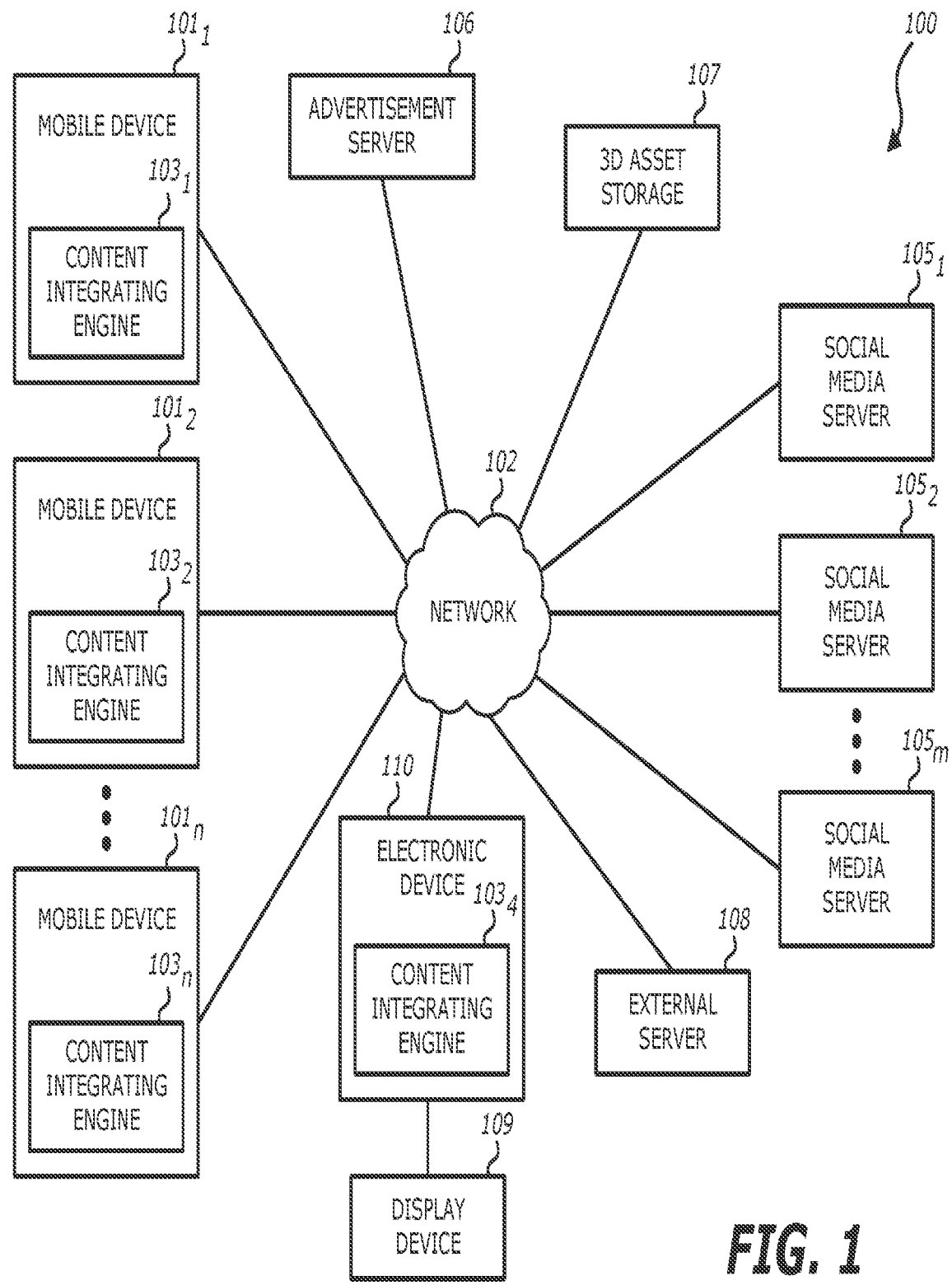
FIG. 1 is a block diagram of a system to integrate content in real-time into a dynamic 3-dimensional (3D) scene according to one embodiment of the invention.

FIG. 1 is a block diagram of a system 100 to integrate content in real-time into a dynamic 3-dimensional (3D) scene according to one embodiment of the invention. The system 100 may be a networked system that includes one or more mobile devices $101_1$-$101_n$ (n≥1), an electronic device 110 coupled to a display device 109, coupled to an external server 108 and one or more social media servers $105_1$-$105_m$ (m≥1) via a trusted and/or un-trusted network 102. The network 102 may be physically located in a secure location to be trusted or may be trusted according to secure connections based on cryptographic protocols, e.g., SSL (Secure Socket Layer), PVN (Private Virtual Networking), or other connections. The network 102 may be a cellular mobile phone network (e.g. a Global System for Mobile communications, GSM, network), including current 2G, 3G, 4G, 5G, LTE networks and their associated call and data protocols; and an IEEE 802.11 data network (WiFi or Wireless Local Area Network, WLAN).

Each of the social media servers $105_1$-$105_m$ may be maintained by a different social media platform (e.g., Facebook™, Instagram™, Twitter™, Vine™, Snapchat™, etc.) and includes data related to the users' of the mobile devices $101_1$-$101_n$ or the users of the electronic device 110. The data related to the users may include for instance their profiles, their connections on the social media platform, the pages the users follow, their posts and a Uniform Resource Locator (URL) to the media content associated with their posts, the timestamp associated with their posts, the name of the user associated with a given post, etc. While the system 100 includes a plurality of social media servers $105_1$-$105_m$, in some embodiments, the system 100 may include a single social media server $105_1$.

Figure 2:
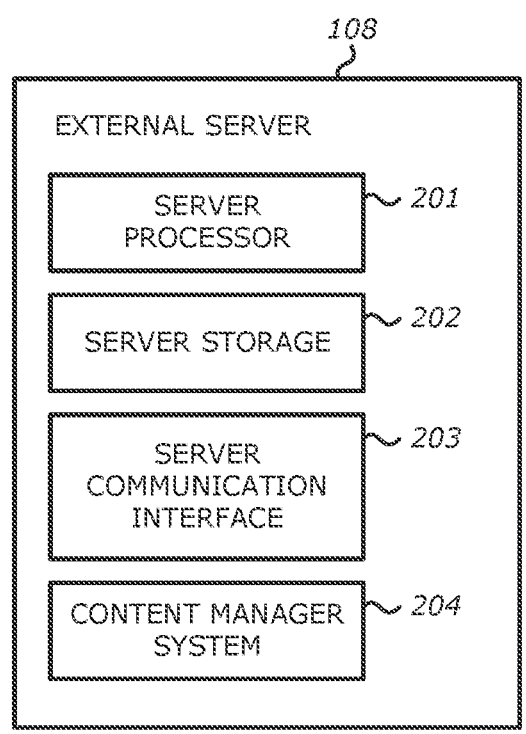
FIG. 2 is a block diagram of the details of the external server included in the system in FIG. 1 according to one embodiment of the invention.

FIG. 2 is a block diagram of the details of the external server 108 included in the system in FIG. 1 according to one embodiment of the invention. The external server 108 includes a server processor 201, a server storage 202, a server communication interface 203, and a content management system 204.

The processor may be a microprocessor, a microcontroller, a cell processor, or a central processing unit. The term "processor" may refer to a device having two or more processing units or elements. e.g. a CPU with multiple processing cores. The processor may be used to control the operations of the server storage 202, the server communication interface 203, and the content management system 204 and specifically, by executing software instructions or code stored in the server storage 202.

The content management system 204 may search for social media posts on at least one of the social media servers $105_1$-$105_m$ using a search parameter. For example, the content management system 204 may be configured to search for social media posts associated with a specific hashtag (e.g., #SuperBowl, #StapleCenter, #ChicagoBulls, #UFC) or social media posts associated with a specific location (e.g., "Montreal Bell Center"). Accordingly, an operator of the electronic device 110 or the mobile devices $101_1$-$101_n$ may set the search parameter by providing the specific keyword, hashtag, or location to locate all the up-to-date social media posts related to that search parameter. Each of the social media posts may include a message and a Uniform Resource Locator (URL) to media content. Examples of media content include video content, audio content, image content, etc. The social media posts may also include the name of the user associated with the social media post and the time and date it was created.

The content management system 204 may communicate with the electronic device 110 or the mobile devices $101_1$-$101_n$ as well as the social media servers $105_1$-$105_m$ via the server communication interface 203. The content management system 204 may acquire the social media posts and content from the social media servers $105_1$-$105_m$ through calls to the public Application Programming Interface (APIs) of social media servers $105_1$-$105_m$. The content management system 204 may store in server storage 202 the social media posts acquired. The server storage 202 may include one or more different types of storage such as hard disk drive storage, nonvolatile memory, and volatile memory such as dynamic random access memory.

Referring back to FIG. 1, the external server 108 is also coupled to an advertisement server 106 and 3D asset storage 107 via the network 102. The advertisement server 102 may store advertisement content that may at least one of: a video advertisement, a rich media advertisement, or a static advertisement. The 3D asset storage 107 may store 3D assets. In one embodiment, the external server 108 and the 3D asset storage 107 may also be a cloud-based server(s) that deliver additional content (Animations. Scenes, models. Characters. Themes) to the content integrating engine $103_1$ in the mobile device $101_1$. In some embodiments, the 3D asset storage 107 is included in the server storage 202.

Figure 4:
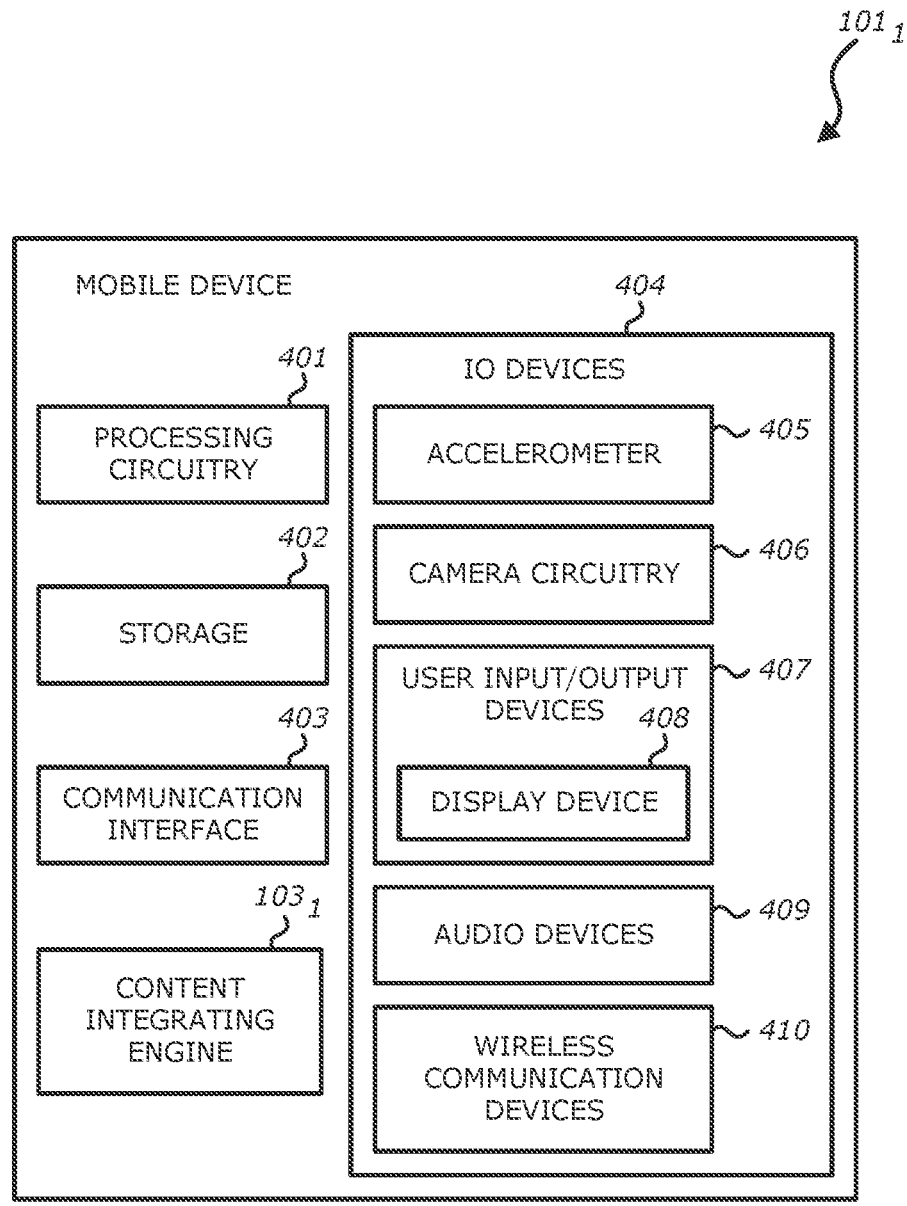
FIG. 4 is a block diagram of the details of the mobile device in the system in FIG. 1 according to one embodiment of the invention.

While FIG. 1 includes a plurality of mobile devices $101_1$-$101_n$, in some embodiments, the system 100 includes one mobile device $101_1$. Similarly, while FIG. 1 includes a single electronic device 110 coupled to a single display device 109, in some embodiments, system 100 includes a plurality of electronic devices 110 that are each coupled to one or more display devices 109, respectively. The electronic device 110 may be a stationary device such as a personal computer that is coupled to a display device 109 which may be, for example, a television display, a computer display, a large format video display board, a tablet computer display, a display included in a virtual reality headset, a projection mapping system display, etc. While not shown, the electronic device 110 may also include the elements of a computing system as described in relation to the mobile devices $101_1$-$101_n$ such as a processor, storage, communication interface, input-output devices, etc. FIG. 4 is a block diagram of the details of one of the mobile devices $101_1$ in the system 100 in FIG. 1 according to one embodiment of the invention. The mobile device $101_1$ may be for example, a mobile telephone device or a smartphone, a tablet computer, a personal digital media player, and a notebook computer, etc., The mobile device $101_1$ includes processing circuitry 401, storage 402, a communication interface 403, and input-output devices 404.

Input-output (I/O) devices 404 allow the mobile device $101_1$ to receive data as well as provide data. In one embodiment, input-output devices 404 may include an accelerometer 405, camera circuitry 406, user input-output (IO) devices 407, display devices 408, audio devices 409, and wireless communications devices 410.

The accelerometer 405 is a sensor that can detect movement or changes in orientation of the device. The accelerometer 405 may be coupled to the processing circuitry 401. In one embodiment, the user may provide a user input that signals a display setting change to the external server 108 by altering the orientation of the mobile device $101_1$. The user inputs may signal display setting changes which may include at least one of: color changes in the 3D scene, changes in a background scene of the 3D scene, changes in animated characters included in the 3D scene, or changes in images uploaded user that are included in the 3D scene. The user inputs from the mobile devices $101_1$-$101_n$ are transmitted by the communication interface 403 to the external server 108 via network 102.

Using the user input-output devices 407, the user may supply commands to control the operations of the mobile device $101_1$. In one embodiment, the user input-output devices 40 include a camera, a microphone, a display device 408 (e.g., a display screen or a touch-sensitive screen ("touch screen")), buttons, microphone and speaker ports.

The camera may be coupled to camera circuitry 406, which includes, for instance, an image sensor to capture digital images. These digital images may be transmitted as media content included in the display setting changes. For example, the user may transmit the digital image as a Tweet™ on Twitter™ or directly as media content to be incorporated in real-time rendering into the 3D scene (or animation). Similarly, using the camera in addition to the microphone included in the mobile device $101_1$, the user may transmit a video as media content to be incorporated in real-time rendering into the 3D scene (or animation).

Audio devices 409 may contain audio-video interface equipment such as jacks and other connectors for external devices. For example, the mobile device $101_1$ may include a headset jack to receive a headset plug.

Input-output devices 404 may also include wireless communications devices 410 having communications circuitry such as radio frequency (RF) transceiver circuitry, antennas, etc. . . . . In one embodiment, the microphone and speaker ports, as well as the headset jack may be coupled to the communications circuitry to enable the user to participate in wireless telephone or video calls that allow or support wireless voice communications. A wireless voice call that uses the wireless communications devices 410 may be a voice-only call or a voice-and-video call that has been placed to or received from any one of a variety of different wireless communications networks and in accordance with any one of several different call protocols. These include: a cellular mobile phone network (e.g. a Global System for Mobile communications, GSM, network), including current 2G, 3G, 4G, 5G, and LTE networks; and an IEEE 802.11 network (WiFi or Wireless Local Area Network, WLAN) which may support wireless voice over internet protocol (VOIP).

The processing circuitry 401 included in device $101_1$ may include a processor, such as a microprocessor, a microcontroller, a digital signal processor, or a central processing unit, and other needed integrated circuits such as glue logic. The term "processor" may refer to a device having two or more processing units or elements, e.g. a CPU with multiple processing cores. The processing circuitry 401 may be used to control the operations of mobile device $101_1$. In some cases, a particular function may be implemented as two or more pieces of software that are being executed by different hardware units of a processor.

In one embodiment, the processing circuitry 401 is also coupled to the storage 402. The storage 402 stores instructions (e.g. software; firmware), which may be executed by the processing circuitry 401. The storage 402 may include one or more different types of storage such as hard disk drive storage, nonvolatile memory, and volatile memory such as dynamic random access memory. In one embodiment, the processing circuitry 401 and storage 402 are used to control functions of the mobile device $101_1$.

For example, the processing circuitry 401 may be coupled to the storage 402 to executes instructions stored therein to control the content integration integrating engine $103_1$ included in mobile device $101_1$ to integrate content in real-time into a dynamic 3-dimensional (3D) scene and to control the display device 408 to display the combined 3D scene output.

As shown in FIG. 1, each of the mobile devices $101_1$-$101_n$ and the electronic device 110 includes a content integrating engine $103_1$-$103_n$ that processes in real-time a plurality of 3D scenes. Each content integrating engine $103_n$ integrates content in real-time in the 3D scenes. Content being integrated may include social media content, advertisement content, 3D assets, etc.

Figure 3:
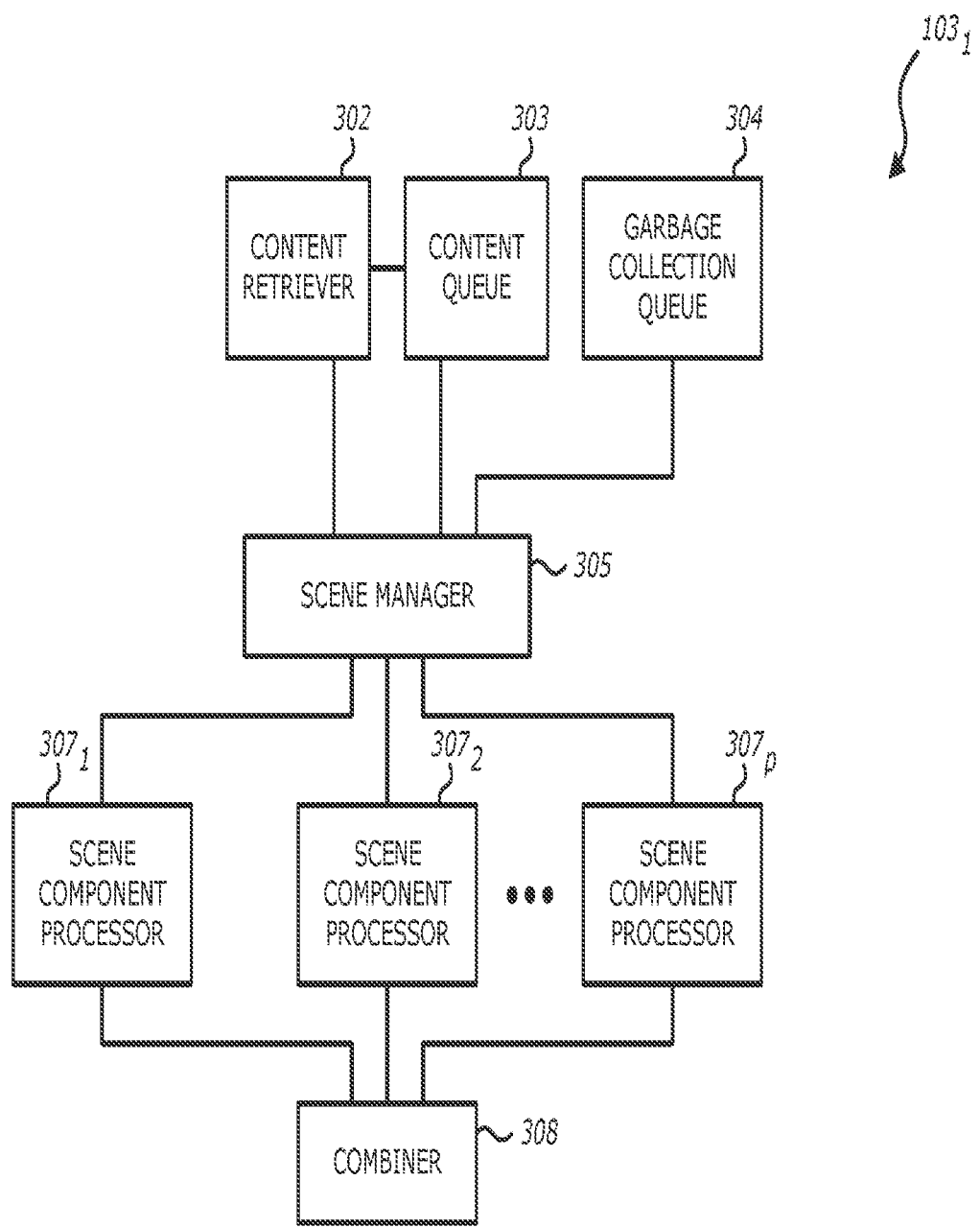
FIG. 3 is a block diagram of the details of the content integrating engine included in the system in FIG. 1 according to one embodiment of the invention.

Referring to FIG. 3, a block diagram of the details of one of the content integrating engine 103 included in the system 100 in FIG. 1 according to one embodiment of the invention is illustrated. The content integrating engine 103 includes a real-time engine that enables the system to render a 3D scene in real-time which further includes up-to-date social media content to be included in the 3D scene being rendered. During the running time of the real-time engine, a process of updating all the 3D scene components included in the 3D scene occurs in an update loop. With each update loop, the 3D scene components are processed such that the real-time engine is able to render the next frame for display. Co-routines that run within the update loop are also implemented as a way of updating 3D scene components over a period of several 3D frames. In one embodiment, the co-routines may be used to process the social media content as described herein.

Referring to FIG. 3, the content integrating engine 103 includes a content retriever 302, a content queue 303, a garbage collection queue 304, a scene manager 305, one or more 3D scene component processors $307_1$-$307_p$ (p≥1), and a combiner 308.

The content retriever 302 establishes a direct connection to the external servers 108 and retrieves URLs to media content in the social media posts stored in the server storage 202. The content retriever 302 may also search for media content included in the display setting changes signaled by the user inputs. For example, a user input may signal to change the display setting (e.g., the background of the 3D scene) to include an image that the user uploaded on the mobile device $101_1$. In some embodiments, the media content included in the display setting change (e.g., uploaded image) is associated with a link.

In FIG. 3, the content queue 303 is coupled to the content retriever 302. The content queue 303 receives and stores, for each of the social media posts, the URLs to media contents. The content queue 303 may also store the link included in media content included in the display setting changes.

Each of the one or more of 3D scene component processors $307_1$-$307_p$ respectively processes a visual component of each of the 3D scenes. For example, a first 3D scene component processor may process the display setting changes to generate a first 3D scene component output. A second 3D scene component processor may process media content corresponding to the URLs in the content queue to generate a second 3D scene component output. In one embodiment, a third 3D scene component processor may process the advertisement content to generate a third 3D scene component output while a fourth 3D scene component processor may process the 3D asset to generate a fourth 3D scene component output.

The scene manager 305 determines when to signal to (or call) each of the components in the content integrating engine 103 to cause the components to perform the functions the components were configured to perform. In one embodiment, the scene manager 305 signals to at least one of the content retriever 302 or one of the 3D scene component processors $307_1$-$307_p$ at a time of low intensity during the 3D scenes. The scene manager 305 may signal to the content retriever 305 at a time of low intensity during the 3D scene to retrieve the media content corresponding to the URLs in the content queue 303. In one embodiment, at a time of low intensity during the 3D scenes, the scene manager 305 may signal to the first 3D scene component processor $307_1$ to process the display setting changes, and may signal to the second 3D scene component processor $307_2$ to process the media content. In one embodiment, the point of low intensity during the 3D scenes is set on a timed basis or at a set point during an animation (e.g., the 3D scenes). By basing the signaling of the scene manager 305 on the intensity of the of the 3D scenes, the content integrating engine 103 further negate the impact of any extra processing required by the 3D scene component processors $307_1$-$307_p$ and content retriever 302 to complete. Accordingly, by timing the functions of the 3D scene component processors $307_1$-$307_p$ and content retriever 302 to occur at low point in activity within the 3D scene, the frame rate of the combined 3D scene output being displayed is maintained.

Referring back to FIG. 3, the garbage collection queue 304 may also be coupled to the scene manager 305. The garbage collection queue 304 frees memory included in the mobile device $101_1$ (e.g., storage 402). In one embodiment, the scene manager 305 signals to the garbage collection queue 304, at a time of low intensity during the 3D scenes, to dequeue and release the memory no longer referenced within the 3D scene. By dequeuing and releasing the memory, the garbage collection queue 304 frees memory in the device.

In one embodiment, the scene manager 305, at a time of low intensity during the 3D scenes, may signal to (or call) the content retriever 302 to retrieve advertisement content from an advertisement server 106, and may signal to a third 3D scene component processor 3073 to process the advertisement content to generate a third 3D scene component output. The advertisement content may be, for example, a video advertisement, a rich media advertisement, or a static advertisement. In one embodiment, the scene manager 305, at a time of low intensity during the 3D scenes, to signal to the content retriever 302 to retrieve a 3D asset from a 3D asset storage 107, and to signal to a fourth 3D scene component processor $307_4$ to process the 3D asset to generate a fourth 3D scene component output.

The scene manager 305 may signal to (or call) the components in the content integrating engine 103 to execute their functions simultaneously (e.g., in parallel) or in series. The combiner 308 receives the outputs from the 3D scene components combine outputs from the one or more 3D scene components processors to generate a combined 3D scene output. In one embodiment, the combiner 308 is a rendering engine that renders the combined 3D scene output in real-time. In one embodiment, the engine interface 301 transmits a combined 3D scene output to the display device 104 in FIG. 1. In another embodiment, the display device 104 may be coupled to the external server 108 via the network 102. In one embodiment, the combined 3D scene output is transmitted to a plurality of display devices 104. The display device 104 may be for instance a television display, a computer display, a large format video display board, a tablet computer display, a display included in a virtual reality headset, or a projection mapping system display. The combined 3D scene output may also be transmitted to the mobile devices $101_1$-$101_n$ to be displayed on the display device included in the mobile devices $101_1$-$101_n$ (e.g., touch screen, display screen, etc.).

The following embodiments of the invention may be described as a process, which is usually depicted as a flowchart, a flow diagram, a sequence diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5A:
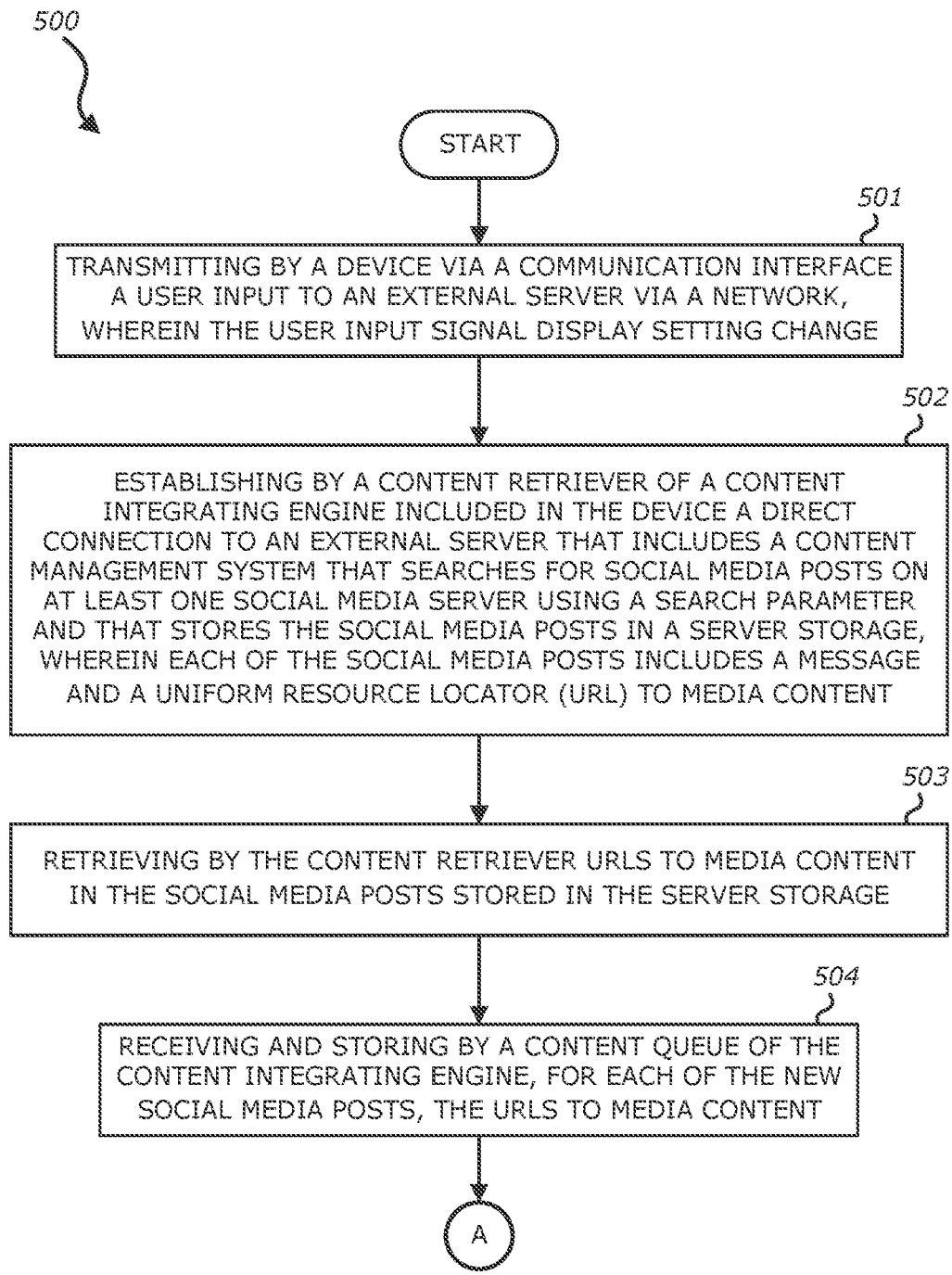
FIGS. 5A-5B illustrates a flow diagram of an example method to integrate content in real-time into a dynamic 3-dimensional (3D) scene according to one embodiment of the invention.
Figure 5B:
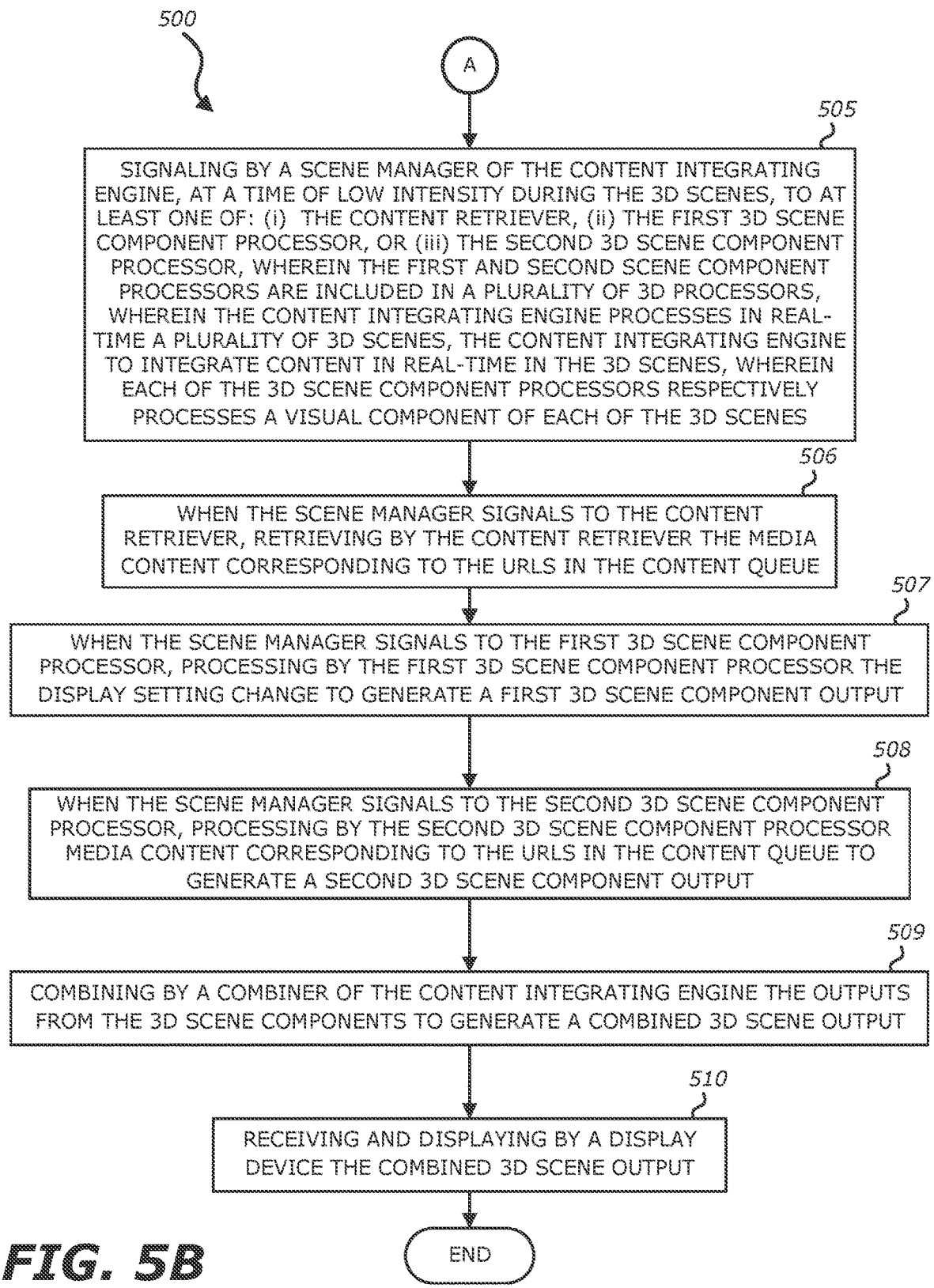

FIGS. 5A-5B illustrates a flow diagram of an example method 500 to integrate content in real-time into a dynamic 3-dimensional (3D) scene according to one embodiment of the invention. The method 500 starts at Block 501 with a communication interface of a device (e.g., mobile device $101_1$ or electronic device 110) transmitting a user input to an external server 108 via a network 102. The user inputs signal a display setting change. For example, a display setting change may include at least one of: color change in the 3D scene, change in a background scene of the 3D scene, change in animated characters included in the 3D scene, or change in images and videos uploaded user that are included in the 3D scene.

At Block 502, a content retriever 302 of a content integrating engine $103_1$ included in the device establishes a direct connection to the external server 108 that includes a content management system 204 that searches for social media posts on at least one social media server $105_1$ using a search parameter and that stores the social media posts in a server storage 202. Each of the social media posts includes a message and a Uniform Resource Locator (URL) to media content. At Block 503, the content retriever 302 retrieves URLs to media content in the social media posts stored in the server storage 202. At Block 504, a content queue 303 of the content integrating engine $103_1$ receives and stores, for each of the social media posts, the URLs to media contents. Media content includes, for example, video content, audio content, and image content. In one embodiment, the content retriever 302 also searches for media content included in the display setting change, and the content queue 303 stores a link to the media content included in the display setting change.

At Block 505, a scene manager 305 of the content integrating engine $103_1$, at a time of low intensity during the 3D scenes, signals to at least one of: (i) the content retriever 302, (ii) the first 3D scene component processor $307_1$, or (iii) the second 3D scene component processor $307_2$. The first and second scene component processors $307_1$, $307_2$ are included in a plurality of 3D processors $307_1$-$307_m$. The content integrating engine $103_1$ processes in real-time a plurality of 3D scenes. The content integrating engine $103_1$ integrates content in real-time in the 3D scenes. Each of the 3D scene component processors $307_1$-$307_m$ respectively processes a visual component of each of the 3D scenes.

At Block 506, when the scene manager 305 signals to the content retriever 302, the content retriever 302 retrieves the media content corresponding to the URLs in the content queue 303. At Block 507, when the scene manager 305 signals to the first 3D scene component processor $307_1$, the first 3D scene component processor $307_1$ processes the display setting change to generate a first 3D scene component output. At Block 508, when the scene manager 305 signals to the second 3D scene component processor $307_2$, the second 3D scene component processor $307_2$ processes media content corresponding to the URLs in the content queue 303 to generate a second 3D scene component output.

At Block 509, a combiner 308 of the content integrating engine combines the outputs from the 3D scene components to generate a combined 3D scene output. In one embodiment, the combiner 308 is a rendering engine that generates in real-time the combined 3D scene output. At Block 510, a display device receives and displays the combined 3D scene output. The display device may be included in the device (e.g., display device 408 in mobile device $101_1$) or may be separate (e.g., display device 109) from the device (e.g., electronic device 110). In one embodiment, the communication interface 403 of the device 101₁ transmits the combined 3D scene output to the display device.

In one embodiment, a garbage collection queue 304 frees memory (e.g., storage 402) included in the device 101₁. In this embodiment, the scene manager 305 signals, at a time of low intensity during the 3D scenes, to the garbage collection queue 304 of the content integrating engine 103₁. When the scene manager 305 signals to the garbage collection queue 304, the garbage collection queue 304 dequeues and releases the memory no longer referenced within the 3D scene.

In another embodiment, when the scene manager 305 signals to the content retriever 302, the content retriever 302 retrieves advertisement content from the server storage 202. The content management system 204 receives the advertisement content from an advertisement server 106. The advertisement content may include, for example, a video advertisement, a rich media advertisement, or a static advertisement. In this embodiment, the scene manager 305 signals, at a time of low intensity during the 3D scenes, to a third 3D scene component processor 307₃. When the scene manager 305 signals to the third 3D scene component processor 307₃, the third 3D component processor 307₃ processes the advertisement content to generate a third 3D scene component output.

In another embodiment, when the scene manager 305 signals to the content retriever 302, the content retriever 302 retrieves a 3D asset from the server storage 202. The content management system 204 receives the 3D asset from a 3D asset storage 107. In this embodiment, the scene manager 305 signals, at a time of low intensity during the 3D scenes, to a fourth 3D scene component processor 307₄. When the scene manager 305 signals to the fourth 3D scene component processor 307₄, the fourth 3D component processor 307₄ processes the 3D asset to generate a fourth 3D scene component output.

Figure 6:
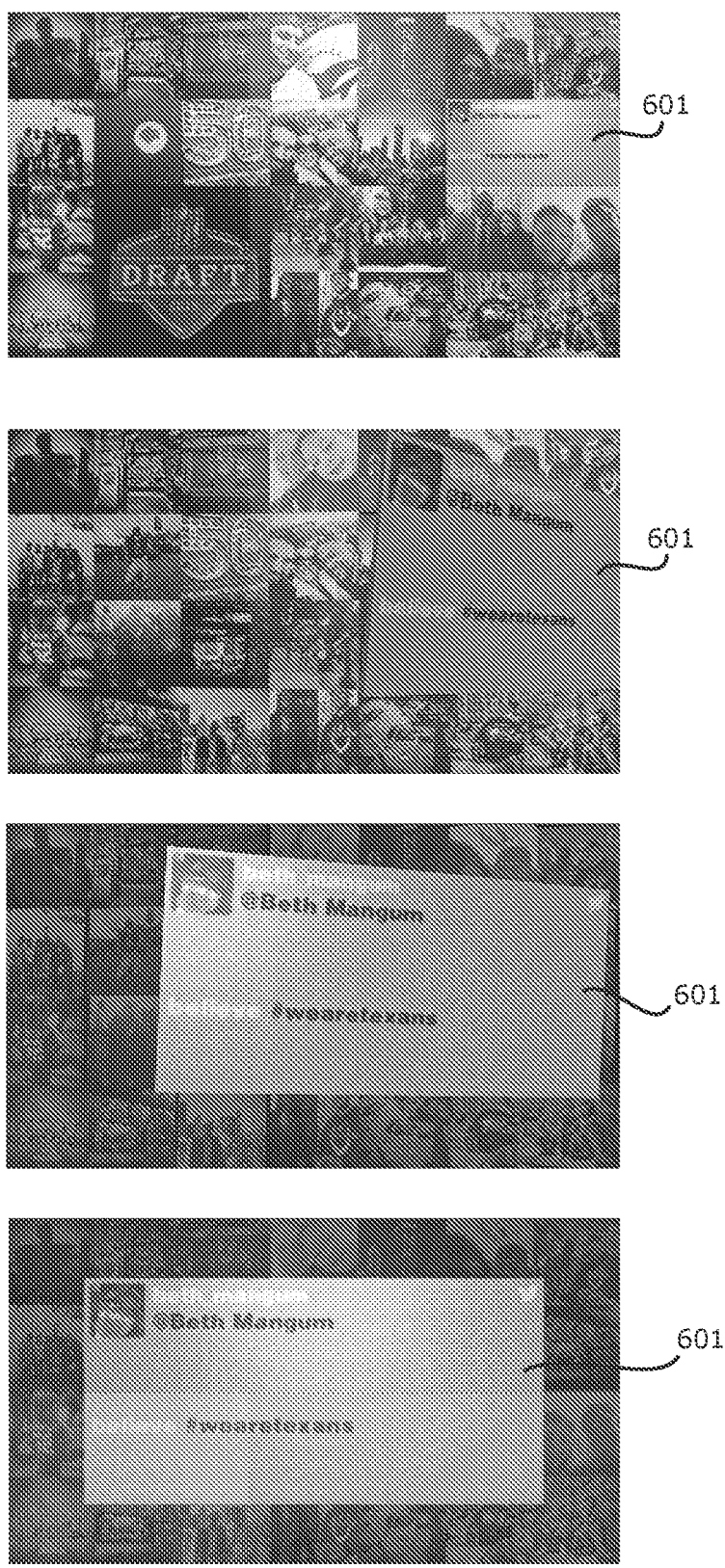
FIGS. 6-8 illustrate exemplary combined 3D scene outputs displayed by a display device according to different embodiments of the invention.
Figure 7:
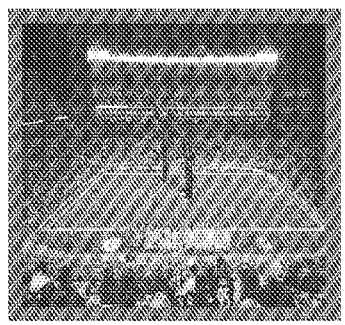
Figure 7:
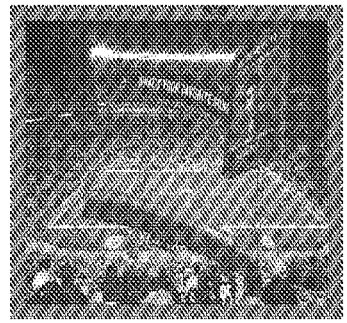
Figure 7:
Figure 7:
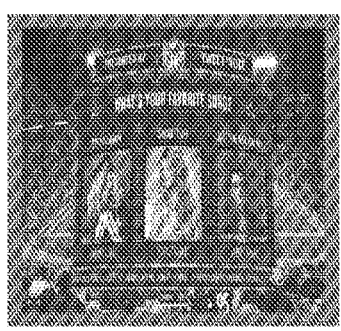
Figure 7:
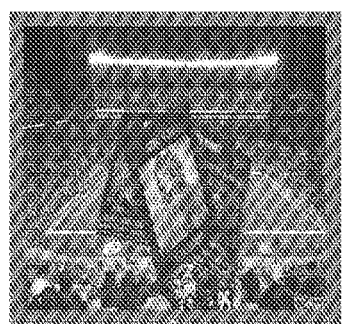
Figure 7:
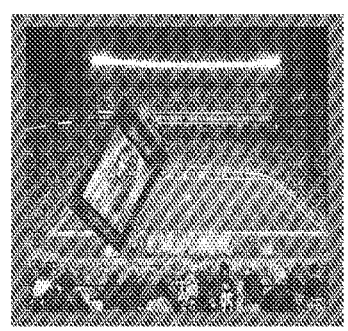
Figure 7:
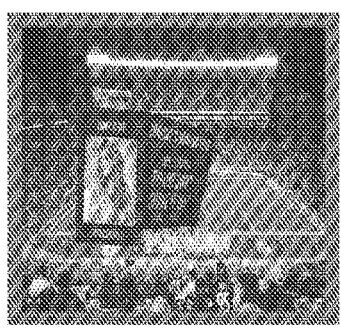
Figure 7:
Figure 7:
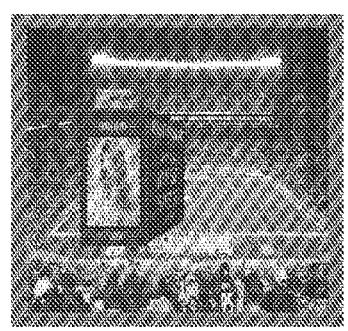
Figure 7:
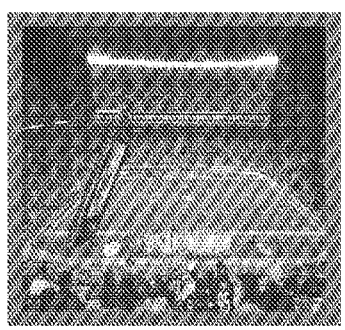
Figure 7:
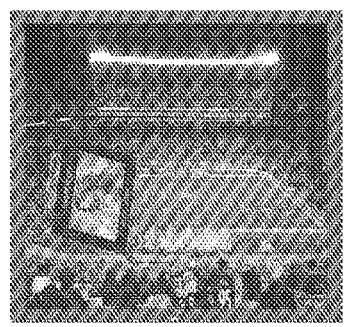
Figure 7:
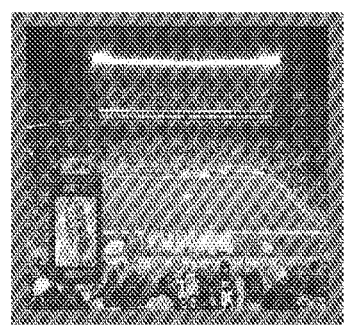
Figure 8:

FIGS. 6-8 illustrate exemplary combined 3D scene outputs displayed by a display device according to different embodiments of the invention. In FIGS. 6-8, the display device may be, for example, a television display, a computer display, a large format video display board, a tablet computer display, a display included in a virtual reality headset, or a projection mapping system display. The display device may also include, for example, holographic projection, direct retina projection, etc. In FIG. 6, the combined 3D scene output displayed may be referred to as the dynamic 3D "Social Wall". The Social Wall is made of up several types of 3D geometric tiles 601. The geometric tiles 601 have dimensional thickness and dynamically animate in a 3D space. Social media content that is retrieved by the content retriever 302 and processed by the second 3D scene component processors 307₂ is combined by the combiner 308 and mapped into one of the tiles 601. The mapped content inherits the material and animation properties of the 3D geometric tiles 601. Each of the tiles 601 may be operated by an operator of the external server 108. The operator may be any user having access to the control of the external server via the network. The size, shape, and resolution of the tiles 601 may be the same or different and are customizable by the operator. The operator may also customize the animation of the tiles 601, the thickness, edge colors, content templates, lighting interactions, visual effects, etc. The Social Wall may be constructed from these individual tiles 601. Any combination of customized tiles 601 may be used to construct the Social Wall. Each individual tile 601 is assigned a set of animations that determines how the tile is to move within 3D environment and how it is to react to the movement of other tiles. The individual tile animations are programmed to be either static or dynamic and may animate in various ways which can include changes in X, Y. Z coordinates, as well as rotational changes over all rotational axes and hinge points set into several types of animations, which may include position changes in X,Y,Z and rotational changes within all three axis's at different rotation and hinge points. These may be adjusted programmatically by the operator to give each 3D tile a unique 3D animation within the 3D grid or randomized to provide unique animations. Although the individual tiles 601 that make up the 3D grid can move independently, the 3D tiles 601 are "connected" together in that all the 3D tiles in the grid can be affected by any transformational effects that are being applied to new or neighboring tiles and are affected by the movement of neighboring 3D tiles and tiles that fall onto the grid from above.

The 3D tiles 601 may include different types of tiles, each with unique animations that an operator can use within the 3D grid to display different types of content both produced or publically generated (such as social content). Types of tiles include for example: "Single" tile, "Take Over" tile, "Overlay feature" tile, "Text Block" tile, "Lower third block" tile. The "Take Over" tile. "Overlay feature" tile, "Text Block" tile. "Lower third block" tile.

For example, the "Single" 3D tile makes up the base structure of the main 3D grid of the Social Wall, these 3D tiles can assume any three-dimensional geometric shape, and are used to display photos, videos, animated GIFs, tweets, or any other publically generated or privately produced content. The "Take Over" tile which is a larger 3D tile relative to the majority of other tiles near by, that can be translated in position to "take over" a predefined area of preexisting 3D tiles. For example, the "Take Over" tile may be animated to occupy the space of a number of 3D tiles (e.g., 8 tiles) in width and a number of 3D tiles (e.g., 8) in height.

The "Take Over" tile is used to display advertisement content (e.g., sponsorship logos, event logos or featured content), 3D assets or media content. The "Take Over" tile animates onto the main 3D tile grid on the z-axis. When it lands on top off the predefined space of "Single" 3D tiles that make up the main 3D grid, the "Take Over" 3D tile has a physical effect on all surrounding and neighboring 3D tiles, such as creating a wave motion similar to dropping a stone in water or any other type of physical motion. In the 3D "Single" tiles that make up the main 3D grid ripple to simulate a "fluid" surface wave motion when the "Take Over" tile lands on the main 3D grid. The operator may have the ability to set the amount of undulation for the "Take Over" 3D tile as well the amount of corresponding ripple and the distance of fall off of the ripple effect across the corresponding 3D "single" tiles.

The "Take Over" 3D tile may sit on the 3D single tile grid surface for a predetermined amount of time. The "Take Over" 3D tile may flip over to reveal a different sponsorship/event logo or featured piece of content at an operator defined preset time interval. For example, the operator may set the "flip" to occur every 30 seconds to cycle through "X" amount of sponsorship/event logos or other featured content.

The operator may have control of how long the "Take Over" 3D tile stays on the surface of the 3D grid before animating off the 3D grids surface out of the viewable area. When the "Take Over" animates off the surface of the 3D single tile grid, the tiles underneath are not visible and thus, there is a "hole" of a predetermined tile dimension on the surface. For example, if the "Take Over" tile size were set by the operator to be 8×8 3D tiles, the "hole" in the 3D single tile grid would be 8×8 3D tiles. As soon as the "Take Over" tiles lifts off the 3D grid the 8 missing "Single" 3D tiles fold back into the surface of the 3D grid to make it whole again. These "folding" tile animations may include rotational and positional changes and may be adjusted by the operator.

Another example of a tile may be the "Text Block" 3D tile, which is similar to the "Take Over" 3D tile. The "Text Block" 3D tile is rectangular in shape and is designed specifically to hold Tweets™ from Twitter™. The "Text Block" 3D tile is always rectangular in shape (FIG. 6). The "Text Block" animates on top of the grid from the z-axis. When it lands on top off the predefined space of "Single" 3D tiles the "Text Block" 3D tile causes a physical effect on all surrounding and neighboring 3D tiles, such as creating a wave motion similar to dropping a stone in water or any other type of physical motion. Again this is achieved programmatically and the operator may have the ability to set the amount of undulation for the "Text Block" 3D tile as well the amount of corresponding ripple and the distance of fall off of the ripple effect across the corresponding 3D "single" tiles.

The "Text Block" 3D tile may sit on the 3D single tile grid surface for a predetermined amount of time. The "Text Block" 3D tile may flip over to reveal a new Tweet at an operator defined preset time interval. For example, the operator may set the "flip" to occur every 30 seconds to cycle through "X" amount of Tweets.

The operator may have control of how long the "Text Block" 3D tile stays on the surface of the 3D grid before "flipping" behind the 3D grids surface out of the viewable area. When the "Text Block" flips away from the surface of the 3D single tile grid, the tiles underneath are revealed and fold back into their place on the 3D grid. For example, if the "Text Block" 3D tile's size is set by the operator to be 1×2 "Single" 3D tiles, there will be two "Single" 3D tiles underneath when the flip rotation begins. As soon as the "Text Block" 3D tile flips behind the 3D grid the 2 underneath "Single" 3D tiles fold back into the surface of the 3D grid to make it whole again. These "folding" tile animations may include rotational and positional changes and may be adjusted by the operator.

The "Overlay Feature" 3D tile is a large 3D tile block, which is used to display and highlight larger format "featured" content. This "featured" content may include but is not limited to a photograph, a video, a Tweet and/or a block of custom type set by the operator. The system may have templates that may allow the operator to place the featured content for mapping on the "Overlay" 3D tiles front face. The "Overlay Feature" 3D tile can be any geometric shape and can be adjusted to any size within the viewable area of the 3D grid. An example of the "Overlay Feature" tile is shown in FIG. 6. The "Overlay Feature" 3D tile does not land directly on the surface of the "Single" 3D tile grid. When the "Overlay Feature" 3D tile animates into the viewable area it hovers over the surface of the "Single" tile 3D grid and may react or influence other assets within the scene (shadows, ripples, reflections, etc.). The "Single" 3D tile grid dims down when the "Overlay Feature" 3D tile animates in. This ensures primary focus by affecting the background through methods that include, but are not limited to, dimming, blurring, fading, etc.

The "Overlay Feature" 3D tile may animate into the viewable area of the "Single" 3D tile grid in a variety of ways from flipping in to spinning in to flying in to dropping in and so on. The operator may have control of a variety of these "in" animations through the systems interface. Although the "Overlay Feature" 3D tile does not touch the surface of the "Single" 3D tile grid below, the "force" of its animation into the scene ripples the "single" 3D tiles underneath in an undulating wave that originates from the point at which the "Overlay Feature" 3D tile enters into the viewable area, top, bottom, left or right.

The "Overlay Feature" 3D tile may act like a carousel. The operator may have the ability to create several "Overlay Feature" 3D tile templates and save them into a playlist. The operator may have the ability to play these in a specific order and set the duration each "Overlay Feature" 3D tile is in the scene. For example, the operator may create a playlist of 10 unique "Overlay Feature" 3D tiles, set their "in", "loop" and "out" animations and durations that they are in the scene.

The operator may have control of how long the "Overlay Feature" 3D tile is over the "Single" 3D tile grid. The operator may have control over which direction the "Overlay Feature" 3D tiles "in" and "out" animations takes place, top, bottom, left, right, or any other direction.

The "Overlay Feature" 3D tile may act like a rotational signboard. The operator may have the ability to "loop" the "Overlay Feature" 3D tile once it has come to a rest within the viewable area. The "loop" may consist of a preset time in which the "Overlay Feature" 3D tile rests in place with a rotational animation in between the rest points. The rotational animation may reveal a new "Overlay Feature" on the backside of the "Overlay Feature" 3D tile.

The operator may have the ability to create several "Overlay Feature" 3D tile templates and save them into a playlist. The operator may have the ability to play these in a specific order and set the duration each "Overlay Feature" 3D tile is in the scene. For example, the operator may create a playlist of ten unique "Overlay Feature" templates that would be applied to a single "Overlay Feature" 3D tile front and back face and set the rest duration between rotational animation points.

The "Lower Third Block" is a geometric 3D tile used to hold a variety of information from that includes, but is not limited to, Sponsorship Information. Calls to action, Promotions, Hashtag information, Tweets and custom messaging specific to an event or team. The "Lower Third Block" animates into the scene in 3D space and hovers above the main dynamic 3D grid. Unlike the "Overlay Feature" 3D tile, the "Lower Third Blocks" movements may or may not affect the 3D tiles of the main grid nor does the main grid dim down when the "Lower Third Block" is active within the 3D scene.

FIG. 7 illustrate combined 3D scene output displayed by a display device that allows for users to respond to polling which manipulates the different 3D elements in the 3D scene being displayed. For example, in FIG. 7, similar to the tiles 601 in FIG. 6, there are a tiles (e.g., 3 in FIG. 7) being overlaid on a 3D background (e.g., 3D stadium). Each of the tiles may be animated in 3D space. For example, each of the tiles in FIG. 7 may represent an artist and a song. The users are asked to vote and in real-time, the user's votes are incorporated into the 3D animation of each of the 3D tiles (e.g., vote percentage bar increase/decreasing). Further, once the voting period is completed, the tile corresponding to the artist and song having the most votes may be animated to rotate to the foreground of the display similar to the "Overlay Feature" tile described in FIG. 6.

FIG. 8 illustrates combined 3D scene output displayed by a display device that shows the 3D transitions for the 3D Social Wall that is used to display "Hero" images. For example, the "Hero" image graphic takes over the full frame from edge to edge and is made up of the front or back faces of all "Single" 3D tiles. This means the "Hero" image covers the entire front of the 3D Social Wall grid facing the front of the display. Each individual "Single" 3D tile that makes up the 3D grid of the 3D Social wall will transition through a preset animation to reveal the "Hero" image. For Example, the individual "Single" 3D tiles may flip over on the axis from the center out to reveal the "Hero" image or the individual "Single" 3D tiles may animate up towards the camera spin and animate back into place relieving the "Hero" image. In one embodiment, the "Hero" image may include a message to be displayed. For example, the "Hero" image may include a message to be displayed during a live event. The message included in the "Hero" image may be static or animated. In one embodiment, the "Hero" image include a full frame video at any resolution.

Figure 9:
FIG. 9 illustrates an exemplary combined 3D scene output displayed by a display device included on a mobile device according to one embodiment of the invention.

FIG. 9 illustrates an exemplary combined 3D scene output displayed by a display device included on a mobile device according to one embodiment of the invention. The combined 3D scene output displayed on the mobile device's display may also provide the user with similar control over the 3D components in the scene. As shown in FIG. 9, the 3D background scene (e.g., 3D stadium), the 3D animated mascot, the images included in the 3D tile the mascot is holding in the 3D output may all be selected and customized by the user. The user may also (i) add personalized content into the real-time dynamic 3D environments (i.e. images and videos may be captured and imported through the devices mobile device's camera, images and videos may be imported through devices photo library or imported through the end user's social feeds/applications); (ii) customizing 3D objects, animations, 3D type, colors, backgrounds; (iii) downloading additional content (3D characters, animations, environments, models, themes) from the 3D asset storage 107, (iv) preview the interactivity of a created message through the mobile device's gyroscope or accelerometer and haptic capabilities, (v) view a real-time preview of all changes made to the scene, and (vi) sharing functionality of completed 3D scene (e.g., combined 3D scene output) across all social networks to be displayed on display devices (desktop, mobile, tablet). In one embodiment, the user can share completed 3D scenes through the in-application network (e.g., content integrating engine 103 application), the scenes will be rendered in real-time for posting and sharing outside the application, completed scenes will be rendered into short video clips or animated Graphics Interchange Format (gifs). In this embodiment, the rendering task can be handled either by the device's processors (e.g., processing circuitry 401) or through cloud rendering servers (e.g., external server 108).

As further shown in FIG. 9, a real-time 3D chat rooms may be included in the combined 3D scene output. In one embodiment, one of the 3D scene component processors receives messages from a chat or messaging platform that is included in the content integrating engine 103, which are processed to generate the 3D output to be combined into the combined 3D scene output in FIG. 9. In this embodiment, the chat messages are coordinated through the external server 108, which acts as a messaging server. The combined 3D scene output may be customized to the user's team preferences with a real-time text messaging system overlay that includes photo and video, real-time game clock, scoreboard, play by play banner, scores and updates from around the leagues, dynamic advertising banners static and video and real-time next generation player statistics that will include dynamic 3D visualizations. The 3D chat rooms will include social meters that visually display which team inside a particular dynamic real-time 3D chat room has more social mentions. The social meter will display dynamic animations as one team is performing well or not, in real time.

Figure 10:
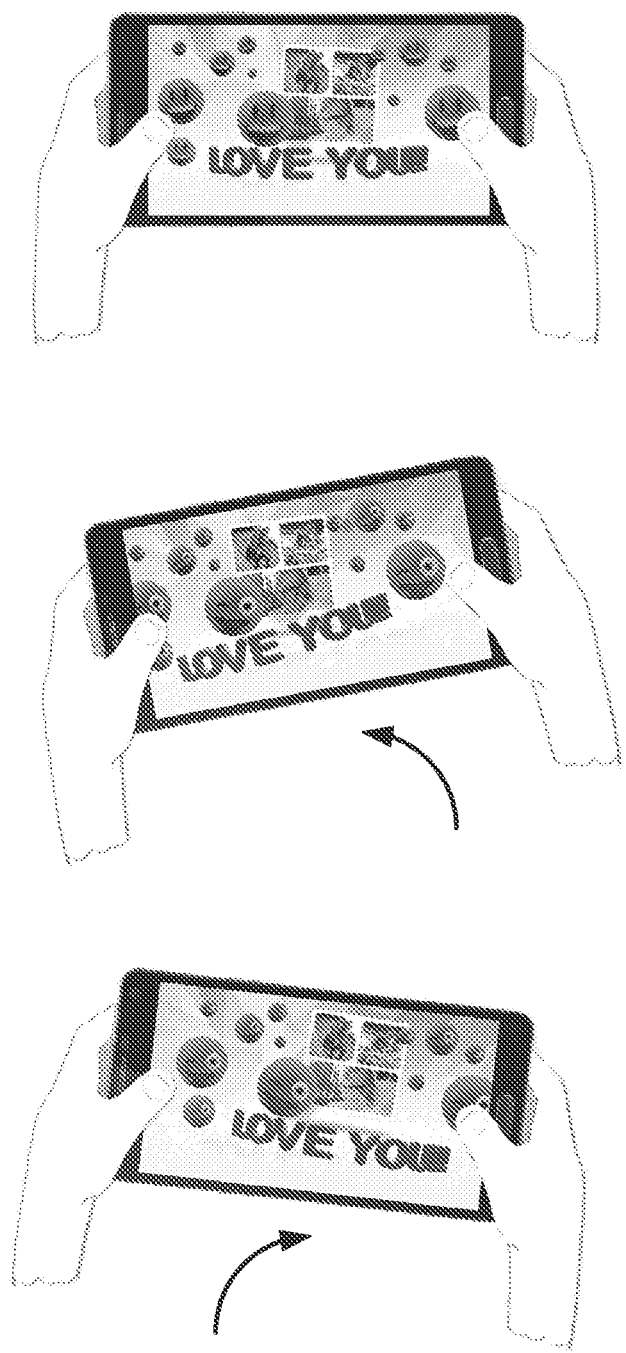
FIG. 10 illustrates an exemplary mobile device in the system in FIG. 1 being manipulated to provide a user input and the exemplary combined 3D scene outputs displayed on the display device included in the mobile device according to one embodiment of the invention.

FIG. 10 illustrates an exemplary mobile device in the systems in FIGS. 1-2 being manipulated to provide a user input and the exemplary combined 3D scene outputs displayed on the display device included in the mobile device according to one embodiment of the invention. In FIG. 9, the user may interact with the 3D Emoticon personalized message by via manipulating the mobile device. For example, the user may tilt the device to the left and to the right. Tilting the device left and right will trigger the Emoticons to slide to the left and to slide to the right from their initial hover state, once the Emoticons begin sliding they will change expressions, in this case they stick their tongues out. When user adjusts the device back to a level position the 3D Emoticons will return to their initial hover state. Furthermore, the user may tilt the device to the left and to the right. Tilting the device left and right will trigger the 3D text to slide to the left and slide to the right from its initial position. In addition the user may tilt the device to the left and to the right, wherein tilting the device left and right will trigger the users photo to slide to the left and to slide to the right from its initial position. Alternatively, or additionally, the user may touch certain objects within the 3D messaging scene to activate unique 3D animation surprises. User may have the ability to touch the individual smiley face Emoticons within the 3D received message to activate the Emoticon(s) to change expression, to wink, to spin, to pop, disappear, etc. Furthermore, the user may touch the 3D customized text message within the 3D personalized message scene to trigger an animation. In one example, the user touches the 3D text message "I love you!" hearts explode out like confetti covering the scene and then dissipating. This surprise heart confetti animation may repeat each time user touches the 3D text, or additional surprise elements may be incorporated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A system to integrate content in real-time into a dynamic 3-dimensional (3D) scene comprising:
   a processor; and
   a memory component, having stored therein, instructions when executed by the processor causes the processor to perform operations comprising:
   retrieving a plurality of social media posts associated with a search parameter, wherein the social media posts include Uniform Resource Locators (URL) to media contents included in the social media posts, the media contents include text or two-dimensional (2D) image;
   generating in real-time a 3D background including a 3D animated character and a 3D tile, wherein generating the 3D background includes:
   retrieving and selecting one of the media contents included in the social media posts,
   mapping the selected one of the media contents to the 3D tile, and causing the 3D tile that includes the one of the media contents to be displayed on at least a front face of the 3D tile; and causing the 3D animated character and the 3D tile to be animated within the 3D background, wherein causing the 3D animated character and the 3D tile to be animated includes:

causing the 3D animated character to interact with the 3D tile, and performing changes to x, y, and z coordinates of the 3D tile and performing rotational changes to the 3D tile.

2. The system of claim 1, wherein causing the 3D animated character to interact with the 3D tile comprises:
causing the 3D animated character to be holding the 3D tile.

3. The system of claim 1, wherein the processor to perform operations further comprising:
changing an appearance of the 3D background.

4. The system of claim 1, wherein the processor to perform operations further comprising:
causing a real time chat room or real-time text messaging system to be displayed as an overlay on the 3D background.

5. The system of claim 4, wherein the real-time text messaging system comprises photo and video, real-time game clock, scoreboard, play by play banner, scores and updates from leagues, dynamic advertising banners, real-time next generation player statistics, or any combination thereof.

6. The system of claim 5, wherein the real-time next generation player statistics includes dynamic 3D visualizations.

7. The system of claim 4, wherein the 3D chat rooms comprises a social meter that visually displays a team having most social mentions in the system.

8. The system of claim 7, wherein the social meter displays dynamic animations based on a performance of the team in real time.

9. The system of claim 1, wherein the processor to perform operations further comprising:
updating the plurality social media posts associated with the search parameter being received, and
updating the media contents included in the plurality of 3D tiles based on the updated social media posts.

10. The system of claim 1, wherein the search parameter is a keyword, a hashtag, location, or any combination thereof.

11. A method to integrate content in real-time into a dynamic 3-dimensional (3D) scene comprising:
retrieving a plurality of social media posts associated with a search parameter, wherein the social media posts include Uniform Resource Locators (URL) to media contents included in the social media posts, the media contents include text or two-dimensional (2D) image;
generating in real-time a 3D background including a 3D animated character and a 3D tile, wherein generating the 3D background includes:
retrieving and selecting one of the media contents included in the social media posts,
mapping the selected one of the media contents to the 3D tile, and
causing the 3D tile that includes the one of the media contents to be displayed on at least a front face of the 3D tile; and
causing the 3D animated character and the 3D tile to be animated within the 3D background, wherein causing the 3D animated character and the 3D tile to be animated includes:
causing the 3D animated character to interact with the 3D tile, and
performing changes to x, y, and z coordinates of the 3D tile and performing rotational changes to the 3D tile.

12. The method of claim 11, wherein causing the 3D animated character to interact with the 3D tile comprises:
causing the 3D animated character to be holding the 3D tile.

13. The method of claim 11, further comprising:
changing an appearance of the 3D background.

14. The method of claim 11, further comprising:
causing a real time chat room or real-time text messaging system to be displayed as an overlay on the 3D background.

15. The method of claim 14, wherein the real-time text messaging system comprises photo and video, real-time game clock, scoreboard, play by play banner, scores and updates from leagues, dynamic advertising banners, real-time next generation player statistics, or any combination thereof.

16. The method of claim 15, wherein the real-time next generation player statistics includes dynamic 3D visualizations.

17. The method of claim 14, wherein the 3D chat rooms comprises a social meter that visually displays a team having most social mentions in the system.

18. The method of claim 17, wherein the social meter displays dynamic animations based on a performance of the team in real time.

19. The method of claim 11, further comprising:
updating the plurality social media posts associated with the search parameter being received, and
updating the media contents included in the plurality of 3D tiles based on the updated social media posts.

20. A non-transitory computer-readable storage medium including instructions, when executed by a processor, causes the processor to perform a method to integrate content in real-time into a dynamic 3-dimensional (3D) scene, the method comprising
retrieving a plurality of social media posts associated with a search parameter, wherein the social media posts include Uniform Resource Locators (URL) to media contents included in the social media posts, the media contents include text or two-dimensional (2D) image;
generating in real-time a 3D background including a 3D animated character and a 3D tile, wherein generating the 3D background includes:
retrieving and selecting one of the media contents included in the social media posts,
mapping the selected one of the media contents to the 3D tile, and
causing the 3D tile that includes the one of the media contents to be displayed on at least a front face of the 3D tile; and
causing the 3D animated character and the 3D tile to be animated within the 3D background, wherein causing the 3D animated character and the 3D tile to be animated includes:
causing the 3D animated character to interact with the 3D tile, and performing changes to x, y, and z coordinates of the 3D tile and performing rotational changes to the 3D tile.

* * * * *